United States Patent [19]
Tanaka et al.

[11] Patent Number: 6,017,630
[45] Date of Patent: Jan. 25, 2000

[54] ULTRAFINE PARTICLE AND PRODUCTION METHOD THEREOF, PRODUCTION METHOD OF ULTRAFINE PARTICLE BONDED BODY, AND FULLERENE AND PRODUCTION METHOD THEREOF

[75] Inventors: Shun-ichiro Tanaka; BingShe Xu, both of Yokohama, Japan

[73] Assignees: Research Development Corporation; Kabushiki Kaisha Toshiba, both of Japan

[21] Appl. No.: 08/861,019

[22] Filed: May 21, 1997

[30] Foreign Application Priority Data

| May 22, 1996 | [JP] | Japan | 8-126642 |
| May 22, 1996 | [JP] | Japan | 8-126643 |
| May 22, 1996 | [JP] | Japan | 8-126644 |

[51] Int. Cl.$^7$ ........................................... B32B 5/16
[52] U.S. Cl. .................... 428/402; 428/408; 428/615; 219/121.68; 219/121.76; 219/121.82; 219/121.85; 385/122; 385/129
[58] Field of Search ..................... 428/615, 408, 428/402; 219/121.85, 121.68, 121.82, 121.76; 385/129, 122

[56] References Cited

U.S. PATENT DOCUMENTS

| 4,670,332 | 6/1987 | Werner et al. | 428/323 |
| 4,735,877 | 4/1988 | Kato et al. | 430/5 |
| 4,983,016 | 1/1991 | Yamamota | 350/126 |
| 4,983,540 | 1/1991 | Yamaguchi et al. | 437/110 |
| 4,985,273 | 1/1991 | Mino | 427/35 |
| 5,113,473 | 5/1992 | Yoshida et al. | 385/131 |
| 5,168,097 | 12/1992 | Araya et al. | 505/1 |
| 5,170,460 | 12/1992 | Arvidsson et al. | 385/129 |
| 5,254,832 | 10/1993 | Gartner et al. | 219/121.66 |
| 5,320,882 | 6/1994 | Chen | 427/597 |
| 5,468,930 | 11/1995 | Nishikawa et al. | 219/121.6 |
| 5,494,711 | 2/1996 | Takeda et al. | 427/473 |
| 5,524,011 | 6/1996 | Lawandy | 372/22 |
| 5,534,071 | 7/1996 | Varshney et al. | 118/726 |
| 5,585,020 | 12/1996 | Becker et al. | 219/121.85 |
| 5,660,746 | 8/1997 | Witanachchi et al. | 219/121.66 |
| 5,683,601 | 11/1997 | Tatah | 219/121.85 |
| 5,772,754 | 6/1998 | Tanaka et al. | 117/5 |

*Primary Examiner*—William Krynski
*Assistant Examiner*—B. Shewareged
*Attorney, Agent, or Firm*—Finnegan, Henderson, Farabow, Garrett & Dunner, L.L.P.

[57] ABSTRACT

A target material having pores is disposed on a substrate. A high energy beam is irradiated to the inner walls of the pores of the target material in a slanting direction. Constituent atoms or molecules of the target material are detached from it to obtain a single or plurality of ultrafine particles separated as a unit substance. The superfine particles are formed at desired positions corresponding to the pores of the target material. Besides, by using an amorphous carbon substrate as the substrate, fullerenes such as an onion-like graphite are formed with the ultrafine particles as nucleation points. When the high energy beam is irradiated to at least two neighboring metal ultrafine particles, these metal ultrafine particles are bonded mutually. When the obtained metal ultrafine particle bonded body has a corresponding grain boundary, the high energy beam is further irradiated to lower value Σ of the corresponding grain boundary of the bonded interface. Besides, the metal ultrafine particle bonded body can also be made into a monocrystal grain or a polycrystal grain. Such a metal ultrafine particle bonded body is stable.

4 Claims, 11 Drawing Sheets

ULTRAFINE PARTICLE AND PRODUCTION METHOD THEREOF, PRODUCTION METHOD OF ULTRAFINE PARTICLE BONDED BODY, AND FULLERENE AND PRODUCTION METHOD THEREOF

BACKGROUND OF THE INVENTION

1. Field of the Invention

The invention relates to ultrafine particles formed of various types of solid materials such as metal, semiconductor and compound and a method for producing the ultrafine particles, a method for producing ultrafine particle bonded bodies, and fullerenes by a novel production method and a method for producing the fullerenes.

2. Description of the Related Art

Metal particles or compound particles such as metal oxide particles, when particles are ultrafine with a diameter of 100 nm or below, they have different properties from normal particles (e.g., 1 $\mu$m or larger). In a ultrafine particle, a number of atoms existed on a particle surface increase relative to total number of atoms of the particle. Therefore, since an effect of surface free energy cannot be ignored in consideration of the properties of particles, new properties may be produced.

The ultrafine particles are suitably used to find a new surface phenomenon and to grasp an outline of the new surface phenomenon. For example, a melting point and a sintering temperature of ultrafine particles decrease in comparison with a bulk. In addition, when there are a plurality of ultrafine particles, a tunnel effect may be caused among them, or quantum mechanical effects (such as a quantum well and a mini band) may take place. A high catalytic effect can be obtained depending on types of ultrafine particles. These ultrafine particles can be used to improve the properties of materials and to develop a very fine device, and can also be applied to functional materials such as a catalyst. Physical properties of ultrafine particles and a usage of ultrafine particles are studied.

Conventional ultrafine particles are produced by, for example, physical or chemical methods. The physical methods for producing ultrafine particles include a gas evaporation method, a metal evaporation synthesis method, and a vacuum evaporation method on a fluid oil. In the gas evaporation method, a metal or the like is evaporated in an inert gas and then ultrafine particles are produced to be cooled and condensed by collision of the evaporated metal with the gas. As a material for ultrafine particles, metal atoms evaporated by sputtering may also be used. In the metal evaporation synthesis method, a metal is heated in a vacuum and vaporized, metal atoms are deposited together with an organic solvent on a substrate which is cooled under a freezing point of the organic solvent. In the vacuum evaporation method on a fluid oil, a metal is deposited on an oil.

Chemical methods for producing ultrafine particles are known to utilize a liquid or gas phase. The production methods using a liquid phase include a colloid method, an alkoxide method, a coprecipitation method and the like. In the colloid method, a noble metal salt is reduced in an alcohol coexisted with a high molecular surface active agent under reflux. In the alkoxide method, it is utilized the hydrolysis of metal alkoxide. In the coprecipitation method, a precipitant is added to a metal salt mixed solution to obtain precipitated particles.

The production methods using a gas phase include a thermal decomposition method for organic metal compounds, a metal chloride reducing/oxidizing/nitriding method, a reduction method in hydrogen, and a solvent evaporation method. In the thermal decomposition method of organic metal compounds, a metal carbonyl compound or the like is pyrolized to obtain metal ultrafine particles. In the metal chloride reducing/oxidizing/nitriding method, a metal chloride is reduced/oxidized or nitrided in a reaction gas flow to obtain ultrafine particles. In the reduction method in hydrogen, an oxide or a hydrate is heated in a hydrogen current to reduce. In the solvent evaporation method, a metal salt solution is atomized through a nozzle to dry by hot air.

Conventional research and development of ultrafine particles are mainly related to an aggregate of ultrafine particles. The properties and applications of ultrafine particles and also various ways of operating and controlling the ultrafine particle as a unit substance are less studied because of the methods for producing the above-described ultrafine particles. Namely, an ultrafine particle was hardly obtained as a unit substance by the conventional production methods.

Some studies are being made to apply the ultrafine particles to devices and various functional materials. But, even if the conventional production methods could produce an ultrafine particle as a unit substance, such methods cannot fully control its formed state. Thus, the ultrafine particles are hindered from being applied. For example, it is expected that ultrafine products, various devices and various functional materials can be produced by bonding ultrafine particles mutually under controlled conditions. But, since researches on control of bonding ultrafine particles mutually are insufficient, the above-described applications and developments have not been completed.

To facilitate researches on the physical properties and the applications of the ultrafine particle as a unit substance, it is demanded to achieve the production of an ultrafine particle as a unit substance. It is also required to achieve a technique that can control a position and a state to produce the ultrafine particle. Furthermore, it is desired to complete a technology which can bond the ultrafine particles as a unit substance under controlled conditions and a technology for stabilizing a bonded ultrafine particle which is significant in applying a bonded ultrafine particle.

SUMMARY OF THE INVENTION

In view of the above circumstances, an object of the present invention is to provide an ultrafine particle which can be obtained as a unit substance with their forming positions and states controlled and can be operated, controlled and applied in various ways, and a method for producing thereof. Another object of the present invention is to provide a method for producing an ultrafine particle bonded body which can bond ultrafine particles mutually as a unit substance under controlled conditions and can stabilize an ultrafine particle bonded body. Still another object of the present invention is to provide a fullerene-containing substance by the novel production method and a novel fullerene production method.

To achieve the above objects, the inventors have made various studies and found that a target material having a pore is disposed on a substrate, and a high energy beam is irradiated to the inner wall of the pore of the target material in a slanting direction, thereby obtaining a single or plurality of ultrafine particles separated as a unit substance and formed of constituent atoms or molecules of the target material. The ultrafine particle can be formed on the substrate at position corresponding to the pore of the target material.

Besides, it was found that the ultrafine particle formed on the amorphous carbon substrate by irradiating the slanting high energy beam to the target material having a pore in a serve to work effectively as a nucleation point of fullerene such as giant fullerenes. With the ultrafine particle utilized as the nucleation point, the fullerene can be formed with good reproducibility and at desired position. Besides, the obtained fullerene are grown by irradiating a high energy beam.

In connection with the bond of the ultrafine particles, the inventors have found the following. When the high energy beam is irradiated to at least two neighboring metal ultrafine particles, these metal ultrafine particles are bonded mutually. When the obtained metal ultrafine particle bonded body has a corresponding grain boundary, value $\Sigma$ of the corresponding grain boundary of the bonded interface can be lowered by additionally irradiating the high energy beam. Besides, the metal ultrafine particle bonded body can be changed into a monocrystal grain or a polycrystal grain. At this time, defects in the monocrystal grain or polycrystal grain are decreased.

An ultrafine particle of the present invention are formed on a substrate by irradiating a slanting high energy beam to a target material having a pore disposed on the substrate, the ultrafine particle consisting of constituent atoms or molecules detached from the target material with the slanting high energy beam irradiation and existing at a position corresponding to the pore of the target material on the substrate.

A method for producing an ultrafine particle according to the present invention comprises the steps of disposing a target material having a pore on a substrate; irradiating a high energy beam to the inner wall of the pore of the target material in a slanting direction to detach constituent atoms or molecules of the target material; and adsorbing the constituent atoms or molecules of the target material detached from the target material to a position corresponding to the pore of the target material on the substrate.

The ultrafine particle of the invention are obtained as unit substance in a separate state on the substrate at the position corresponding to the pore of the target material. Therefore, various operations and controls can be achieved. Utilizing these ultrafine particles, applications to electronic devices based on a tunnel effect among the ultrafine particles or quantum mechanical effects (such as a quantum well and a mini band) and to various functional materials utilizing high characteristic properties are facilitated. And, the component materials for the ultrafine particle can be determined in accordance with the types of target material, and an atmosphere in which the high energy beam is irradiated. Therefore, various ultrafine particles such as a metal ultrafine particle, a semiconductor ultrafine particle and a compound ultrafine particle can be obtained relatively easily. Besides, the states of their crystals can be controlled.

A method for producing an ultrafine particle bonded body according to the present invention comprises the steps of bonding at least two neighboring metal ultrafine particles to produce a metal ultrafine particle bonded body having a corresponding grain boundary by irradiating a high energy beam to at least the two metal ultrafine particles; and stabilizing the metal ultrafine particle bonded body by additionally irradiating the high energy beam to the metal ultrafine particle bonded body having the corresponding grain boundary.

The method for producing the ultrafine particle bonded body according to the invention lowers value $\Sigma$ of the corresponding grain boundary of the metal ultrafine particle bonded body in the stabilizing step. Besides, the metal ultrafine particle bonded body with the value $\Sigma$ of the corresponding grain boundary lowered is changed to a monocrystal grain or a polycrystal grain and defects in the monocrystal grain or polycrystal grain are decreased in the stabilizing step.

Another method for producing ultrafine particle bonded bodies according to the invention comprises the steps of bonding at least two neighboring metal ultrafine particles in a plurality of metal ultrafine particles dispersed on a substrate to produce a plurality of metal ultrafine particle bonded bodies by irradiating a high energy beam to the plurality of metal ultrafine particles; and stabilizing the metal ultrafine particle bonded bodies by additionally irradiating the high energy beam to the plurality of metal ultrafine particles bonded bodies to lower value $\Sigma$ of the metal ultrafine particle bonded bodies having the corresponding grain boundary.

A fullerene-containing substance according to the present invention comprises an amorphous carbon substrate; and a fullerene disposed on or near a surface of the amorphous carbon substrate and formed as a nucleation point with constituent atoms or molecules detached from a target material having a pore disposed on the amorphous carbon substrate by a slanting high energy beam irradiation and adsorbed on the surface of the amorphous carbon substrate at a position corresponding to the pore of the target material.

And, another fullerene-containing substance according to the invention has the plurality of fullerenes which are formed on or near a surface of the amorphous carbon substrate mutually connected to form a film-shaped structure.

A method for producing a fullerene according to the present invention comprises the steps disposing a target material having a pore on an amorphous carbon substrate; irradiating a high energy beam to the inner wall of the pore of the target material in a slanting direction to collide constituent atoms or molecules of the target material with the surface of the amorphous carbon substrate; and forming a fullerene on or near a surface of the amorphous carbon substrate with the collision point of the constituent atoms or molecules of the target material as nucleation point.

Besides, the method for producing the fullerene according to the invention irradiates the same or different high energy beam to the amorphous carbon substrate to grow the fullerene.

The fullerene according to the invention can be obtained under the controlled conditions with good reproducibility. The fullerene has the ultrafine particle, which are detached from the target material and adsorbed on the surface of the amorphous carbon substrate, as the nucleation point, so that the forming position can be controlled according to the shape of the pore of the target material. The obtained fullerene are grown by further irradiating the high energy beam to the amorphous carbon substrate. Therefore, the shape of the fullerene can be controlled. For example, a plurality of fullerenes can be connected mutually to form a film-shaped structure. Thus, the present invention can control and operate the fullerene in various ways.

DESCRIPTION OF THE PREFERRED EMBODIMENTS

Embodiments of the invention will be described with reference to the drawings.

Figure 1A:
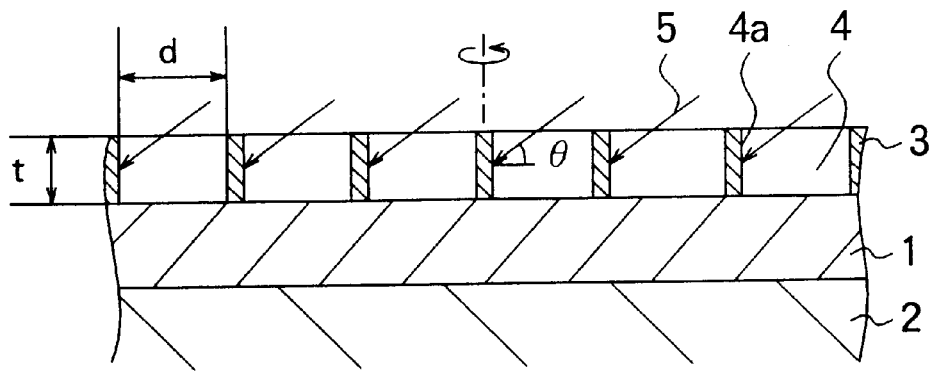
FIG. 1A, FIG. 1B, and FIG. 1C are sectional views schematically showing one embodiment of a process for producing ultrafine particles of the invention.
Figure 1B:
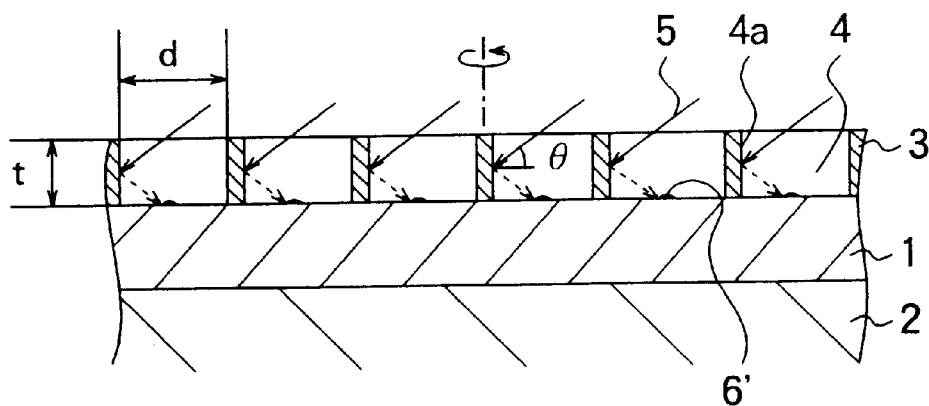
Figure 1C:
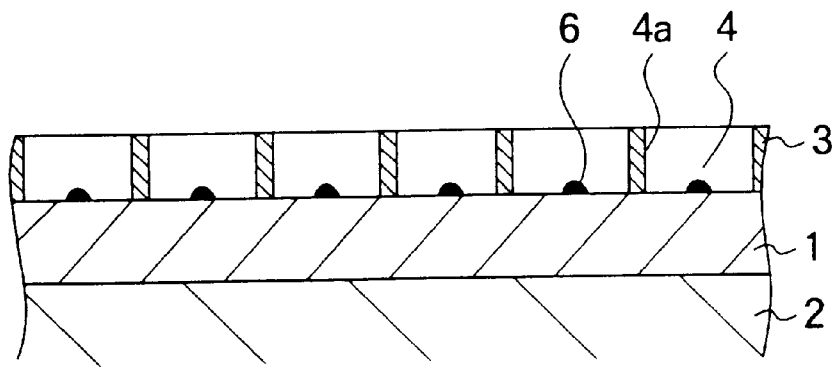

FIG. 1A to FIG. 1C are sectional views schematically showing one embodiment of a process for producing ultrafine particles of the invention. In these drawings, reference numeral 1 designates a substrate which is disposed on a supporting member 2 to form ultrafine particles thereon. The substrate 1 can be formed of any type of solid materials regardless of whether it is a crystalline substrate or an amorphous substrate. For example, metal, non-metal, semiconductor, compound and other substrates can be used.

As shown in FIG. 1A, a target material 3, which is a material for forming ultrafine particles, is disposed on the substrate 1. The target material 3 has a plurality of pores 4. A high energy beam 5 is irradiated to an inner wall 4a of each pore 4 in a slanting direction from above. The target material 3 having a plurality of pores 4 can be a mesh material, and a film which has the pores 4 formed by a chemical method such as etching or an electrochemical method, or a film having the pores 4 formed by a laser beam. The target material 3 is not limited to a single body, but may be a laminate formed of a plurality of different target materials. The target material 3 can be various types of solid materials such as various metals such as Pt, Au, Cu and Al used alone and alloys thereof; semiconductors such as Si; compounds such as metal oxides, metal chlorides, metal fluorides and metal borides.

The pores 4 of the target material 3 provide positions where ultrafine particles are formed. The inner wall 4a of the pore 4 forms a surface of supplying a material for forming ultrafine particles, namely the constituent atoms or molecules of the target material 3. Therefore, the shape and arrangement of the pores 4 and the thickness of the target material 3 are determined taking into account the shape and arrangement of ultrafine particles to be obtained and an incident angle θ of the high energy beam 5. Specifically, it is preferable that the pore 4 has a diameter of 0.1 to $1 \times 10^3$ μm, and the target material 3 has a thickness of about 0.2 to $1 \times 10^3$ μm. If the pores 4 have an excessively small diameter or the target material 3 is excessively thin, the incident angle θ of the high energy beam 5 is limited, and the production of ultrafine particles may be performed with difficulty. Conversely, if the pores 4 have an excessively small diameter or the target material 3 is excessively thick, it becomes hard to produce ultrafine particles.

The incident angle θ of the high energy beam 5 depends on a diameter d of the pore 4 and a thickness t of the target material 3. The incident angle θ of the high energy beam 5 is desirably set to fall in a range of 20 to 45 degrees to obtain ultrafine particles having a diameter of about 1 to 10 nm. Therefore, the diameter d of the pore 4 and the thickness t of the target material 3 are preferably set so that $\tan^{-1}(t/d)$ is in a range of 20 to 45 degrees. Besides, it is more preferable to set so that $\tan^{-1}(t/d)$ is in a range of 30 to 45 degrees.

As shown in FIG. 1B, when the high energy beam 5 is irradiated to the inner wall 4a of the pore 4 in a slanting direction from above, the constituent atoms or molecules of the target material 3 are detached (indicated by the arrows with a dotted line). The constituent atoms or molecules detached from the target material 3 adsorb on the substrate 1. In the drawing, 6' denotes an adsorbent.

The high energy beam 5 to be irradiated is not limited particularly. As far as it has energy sufficient to detach the constituent atoms or molecules from the target material 3, any type of the high energy beam 5 can be used. As the high energy beam 5, an ion beam such as an argon ion beam having an acceleration voltage of 2 to 5 kV and a beam current of about 0.1 to 1 mA is used. There can be used an electron beam, a laser beam, X-rays, γ-rays or a neutron beam which can give the same impact to the target material 3 as does the ion beam. But, various conditions shall be determined in consideration of the separation of the constituent atoms or molecules from the target material 3 that is substantially determined by an impact resistance of the target material 3 against the high energy beam 5, namely the bond energy of crystals of the target material 3.

When an ion beam is used as the high energy beam 5 but an acceleration voltage or a beam current is excessively low, the constituent atoms or molecules cannot be detached efficiently from the target material 3. Conversely, when an acceleration voltage or a beam current is excessively high, damages to the target material 3 alone are increased, and it is hard to control the state of the constituent atoms or molecules. This is also applied when an electron beam, a laser beam, X-rays, γ-rays or a neutron beam is used as the high energy beam 5.

An atmosphere in which the high energy beam 5 is irradiated is determined corresponding to the beam used. For example, such an atmosphere includes a vacuum atmosphere or an inert atmosphere such as an argon atmosphere. To form compound ultrafine particles, an oxygen-containing atmosphere or a nitrogen atmosphere may be used.

As shown in FIG. 1C, by irradiating the high energy beam 5 for a predetermined period to detach the constituent atoms or molecules from the target material 3 continuously, target ultrafine particles 6 are formed on the substrate 1. FIG. 1C illustrates a state that the ultrafine particles 6 are formed one each on the substrate 1 at respective points corresponding to the pores 4 of the target material 3. The number of ultrafine particles 6 formed at the positions corresponding to the pores 4 can be controlled by the diameter of the pores 4 and the irradiation conditions of the high energy beam 5. A plurality of ultrafine particles 6 which are separated as a unit substance can be formed on the substrate 1 at point corresponding to the pore 4.

The ultrafine particles 6 can be obtained as a unit substance particle in a separated state with their forming positions on the substrate 1 corresponded with the pores 4 of the target material 3. The diameter of the ultrafine particles 6 can be controlled to, for example, about 1 to 10 nm. The duration of irradiating the high energy beam 5 is determined as required in conformity with the intensity of the high energy beam 5 or the size of the target ultrafine particles 6.

The substrate 1 being irradiated with the high energy beam may be in a state held at room temperature or in a heated state. The temperatures of the substrate 1 have an effect on the crystalline state of the ultrafine particles obtained. When the substrate 1 is at room temperature, it is easy to obtain the ultrafine particles 6 in a low crystalline state or an amorphous state. When the substrate 1 is heated, the crystalline state of the ultrafine particles 6 can be controlled by the heated temperature. The crystalline state of the ultrafine particles 6 can also be controlled by heating the substrate or irradiating with an electron beam after the ultrafine particles 6 are formed. Besides, the substrate 1 may be rotated when the high energy beam 5 is irradiated. Thus, the ultrafine particles 6 can be formed efficiently.

As described above, the size, state and number of the ultrafine particles 6 to be obtained can be controlled by the temperature of the substrate 1, the intensity, irradiation time and irradiation atmosphere of the high energy beam 5, the rotation or not and the rotation speed of the substrate 1, the thickness of the target material 3, and the diameter of the pores 4. Thus, the ultrafine particles 6 can be obtained in various types suitable for application purposes. And, the ultrafine particles 6 are formed as a unit substance in a separated state at positions in correspondence with the pores 4 of the target material 3 on the substrate 1. Therefore, they can be applied to electron devices and high functional catalysts utilizing, for example, a tunnel effect among the ultrafine particles, or quantum mechanical effects (such as a quantum well and a mini band).

For example, by forming a large number of metal ultrafine particles on an insulated substrate in a separated state, an M-I-M diode utilizing a tunnel current flowing among the metal ultrafine particles can be produced. It is now under review to use such an M-I-M diode in a large number to construct a high speed detector or a frequency mixer which responds to from microwaves to millimeter waves and infrared portion. The ultrafine particles 6 of the invention can be used to produce such electron devices under control.

And, in addition to the production of a high speed detector or a frequency mixer, the ultrafine particles 6 of the invention can be used to produce various diodes, Josephson junction devices, and devices utilizing a quantum well and a mini band. Besides, the ultrafine particles 6 of the invention can be applied to various functional materials such as nonlinear optical materials, catalysts, biomedical materials and atomic filters. In the case of applying to such various electron devices and functional materials, a research on application feasibility and the expansion of a range of applications can be made because the component materials and crystalline states of the ultrafine particles 6 can be controlled.

Description will be made of an embodiment of the method for producing an ultrafine particle bonded body of the invention.

Figure 2A:
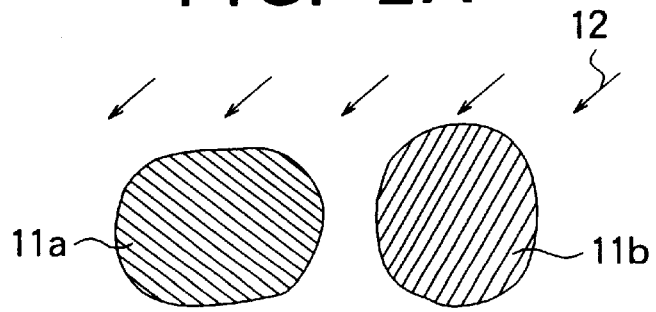
FIG. 2A, FIG. 2B, and FIG. 2C are schematic views showing one embodiment of a process for producing an ultrafine particle bonded body of the invention.
Figure 2B:
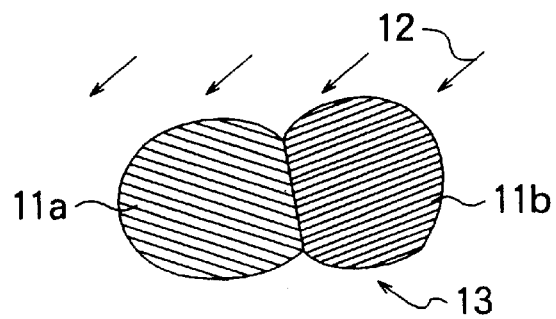
Figure 2C:
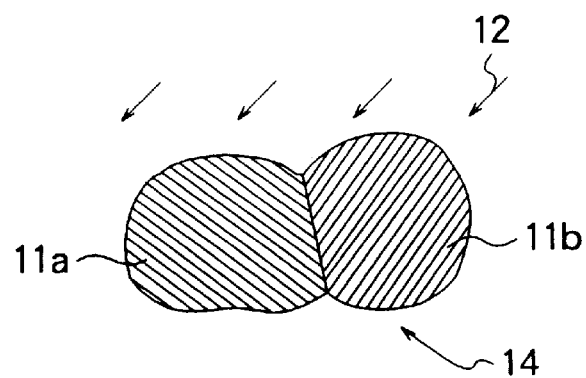

FIG. 2A to FIG. 2C are schematic views showing one embodiment of a process for producing an ultrafine particle bonded body of the invention. FIG. 2A shows that at least two neighboring metal ultrafine particles 11a, 11b are irradiated with a high energy beam 12.

Metal ultrafine particles 11 are metal ultrafine particles forming a corresponding grain boundary, such as Pt ultrafine particles, Au ultrafine particles and Cu ultrafine particles. The metal ultrafine particles 11 have preferably a diameter of about 1 to 30 nm. When the metal ultrafine particles 11 as the starting material have a diameter of more than 30 nm, fusion may not be effected by irradiating the high energy beam 12. On the other hand, the metal ultrafine particles 11 having a diameter of less than 1 nm are hard to produce and hardly kept in stable existence. A gap between the two neighboring metal ultrafine particles 11a, 11b is preferably equal to about their diameters.

The metal ultrafine particles 11 as the starting material are not restricted to be produced by a particular method as far as they can be produced and controlled as the unit substance of metal ultrafine particles. Thus, the metal ultrafine particles 11 can be any type which is produced by various methods for producing metal ultrafine particles. Especially, a method for producing the above-described ultrafine particles of the invention is effective as a method to produce the metal ultrafine particles 11.

The high energy beam 12 which is irradiated to the metal ultrafine particles 11 is not limited to a particular one if it has energy sufficient to fuse the two metal ultrafine particles 11a, 11b. The high energy beam 12 is for example an electron beam having an intensity of, for example, $1 \times 10^{18}$ e/cm$^2$·sec or higher. A particle beam such as an ion beam having the same intensity as this electron beam, a photon such as a laser beam, X-rays, γ-rays or a neutron beam may be used as the high energy beam 12.

When the electron beam is used as the high energy beam 12 and its intensity is less than $1 \times 10^{18}$ e/cm$^2$·sec, the metal ultrafine particles 11 may not be activated sufficiently to produce a bonded body of metal superfine particles. In other words, the electron beam having an intensity of $1 \times 10^{18}$ e/cm$^2$·sec or more provides effects of activating and locally heating the metal ultrafine particles 11, enabling the production of a bonded body of metal ultrafine particles. The electron beam has more preferably an intensity of $1\times10^{19}$ e/cm$^2$·sec or more in a practical point of view. This is also applied when a particle beam, a photon, X-rays, γ-rays or a neutron beam is used as the high energy beam 12.

An atmosphere in which the high energy beam 12 is irradiated is determined according to a beam used. For example, a vacuum atmosphere, an argon atmosphere or another inert atmosphere is used. In addition, an oxygen-containing atmosphere or a nitrogen atmosphere may be used in some cases. For example, when an electron beam is applied, it is desirable to have a vacuum atmosphere of $1\times10^{-3}$ Pa or below. By irradiating the electron beam in a vacuum atmosphere, remaining gas atoms can be prevented from being adsorbed. The high energy beam 12 can be irradiated on a room temperature stage.

When the two neighboring metal ultrafine particles 11a, 11b are irradiated with the high energy beam 12 at the same time, the metal ultrafine particles 11a, 11b are activated to start to come closer mutually, resulting in bonding of the metal ultrafine particles 11a, 11b mutually. Crystal orientation of the metal ultrafine particles 11a, 11b before irradiating the high energy beam 12 are random. Therefore, a metal ultrafine particle bonded body at the start of bonding (hereinafter called the initial bonded body) 13 has a high possibility that value Σ of a corresponding grain boundary on the bonded interface is high though variable depending on the crystal orientation and distance of the metal ultrafine particles 11a, 11b before irradiating and the intensity of the high energy beam 12. The initial bonded body 13 having value Σ of the corresponding grain boundary at a high level has a high surface energy and can be said to be in an instable state.

The value Σ is an index to indicate in which orientation and what interval a periodic structure is formed by two crystals which have the same crystal structure and lattice constant with a crystal grain boundary therebetween. Specifically, when it is assumed that two crystals are mutually contacted with an interface therebetween and through lattices of the crystals are related to rotate about a specific meromorphic crystal axis, the lattice points of both crystals overlap partly when a rotation angle has a particular value. A lattice formed by the overlapped position is called a coincidence site lattice (CSL). Among the lattice points of both crystals, when the lattice points match at a ratio of 1/Σ, the CSL is indicated by value Σ (an odd number at all times). The simplest CSL excepting the same crystal in a cubic system has a grain boundary Σ3.

When the initial bonded body 13 is further irradiated with the high energy beam 12, the respective metal ultrafine particles 11a, 11b have their atomic arrangements changed to decrease surface energy on the bonded interface. Accordingly, value Σ of the corresponding grain boundary of the initial bonded body 13 is lowered. Specifically, by the additional irradiation of the high energy beam 12, the initial bonded body 13 becomes a metal ultrafine particle bonded body 14 which has the value Σ of corresponding grain boundary at 3 as shown in FIG. 2C.

The metal ultrafine particle bonded body 14 is in the most stable state (minimum value Σ) among the bonded bodies having corresponding grain boundaries. Therefore, it can be said to be a metal ultrafine particle bonded body having a stabilized corresponding grain boundary (hereinafter called a metastabilized bonded body).

When the metastabilized bonded body 14 is further irradiated with the high energy beam 12, the metastabilized bonded body become, for example, a monocrystal grain by changing their atomic arrangements of the respective metal ultrafine particles 11a, 11b so as to have the same crystal face and crystal orientation on the bonded interface. At this time, there are generally lattice defects such as transformation, disclination and point defects and subboundaries in the crystal grains, but such lattice defects and subboundaries are decreased or eliminated owing to the changes of the atomic arrangements.

Thus, the irradiation of the high energy beam 12 to the metastabilized bonded body 14 stabilizes the metal ultrafine particle bonded body by changing the bonded nanoparticles into monocrystal grain and decreasing or eliminating the lattice defects and subboundaries in the monocrystal grain.

The change from the initial bonded body 13 to the metastabilized bonded body 14 and the change from the metastabilized bonded body 14 to the monocrystal grain are variable depending on the intensity and irradiation time of the high energy beam 12 and the crystal orientation and distance of the initial metal ultrafine particles 11a, 11b. Therefore, a constant state is not always obtained, and it is possible that polycrystal grain is produced. The higher the intensity of the high energy beam 12 or the longer the irradiation time, the more stable state can be achieved with good reproducibility. The high energy beam 12 is desired to have an intensity of $1\times10^{19}$ e/cm$^2$·sec or more when the electron beam is used, and its irradiation time is preferably 100 seconds or more.

Thus, the metal superfine particle bonded body (initial bonded body) 13 is obtained by irradiating at least two neighboring metal ultrafine particles 11a, 11b with the high energy beam 12. By irradiating the high energy beam 12 to the initial bonded body 13, value Σ of the corresponding grain boundary on the bonded interface is lowered and the bonded nanoparticles are changed into monocrystal grain and then the lattice defects and subboundaries are decreased, thereby stabilizing the bonded nanoparticles. Therefore, to apply to, for example, ultrafine products, various devices and various functional materials, metal ultrafine particle bonded bodies stabilized in various states can be provided.

In the above embodiment, a metal ultrafine particle bonded body which have not undergone the bonded state and further a stabilized metal ultrafine particle bonded body can be formed on a room temperature stage. Generally, since it is difficult to irradiate the high energy beam such as an electron beam under controlled heating conditions, it is very significant to enable the production of a metal ultrafine particle bonded body on a room temperature stage.

Figure 3:
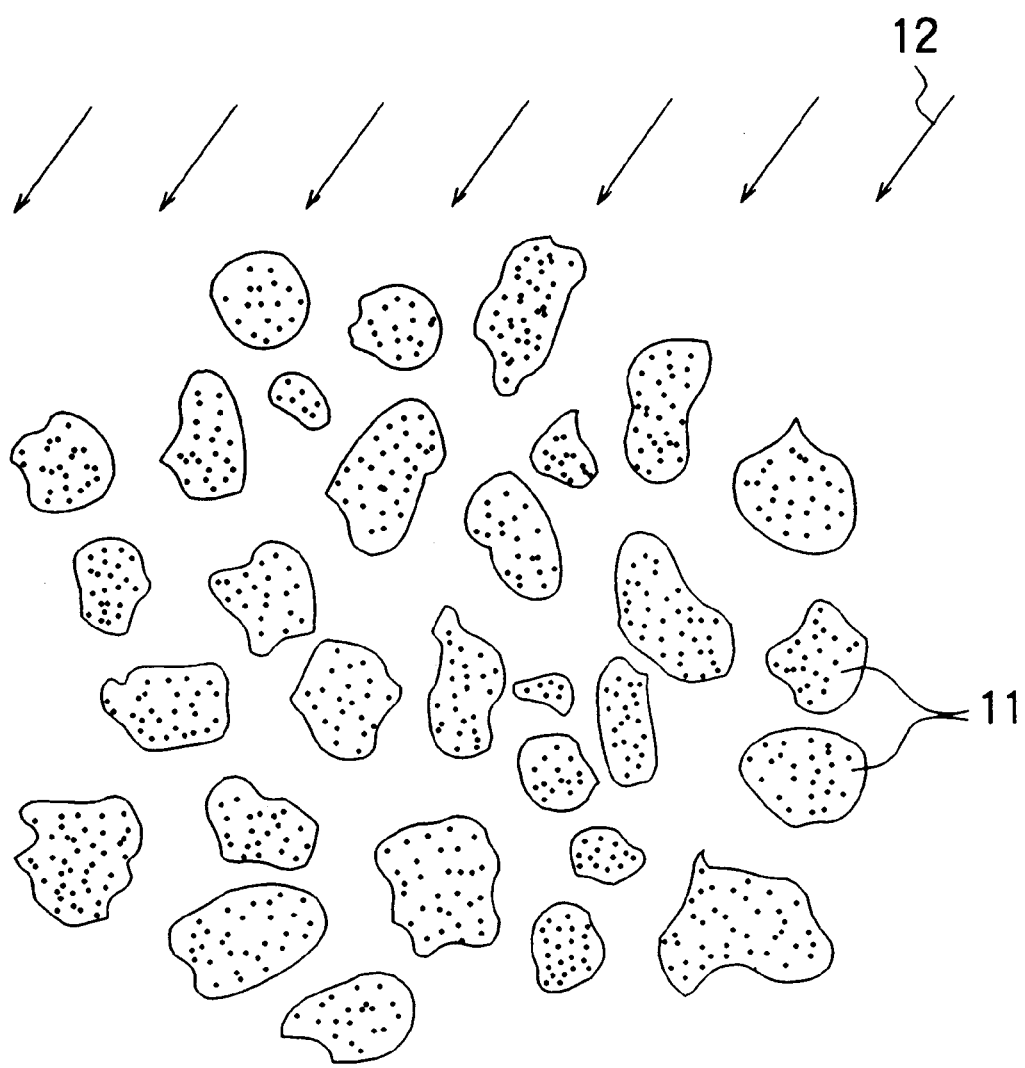
FIG. 3 is a schematic view showing another embodiment of metal ultrafine particles to be used as starting material for an ultrafine particle bonded body.

FIG. 2 shows the two neighboring metal ultrafine particles 11a, 11b only. The metal ultrafine particles as the starting material for the metal ultrafine particle bonded body may be a large number of metal ultrafine particles 11 which are dispersed on a substrate 15 as shown in FIG. 3. By irradiating the high energy beam 12 to these many metal ultrafine particles 11 at the same time, two or more neighboring ultrafine particles 11, 11 . . . are bonded to produce a plurality of metal ultrafine particle bonded bodies.

Among such a plurality of metal ultrafine particle bonded bodies, value Σ of the metal ultrafine particle bonded body having the corresponding grain boundary is variable depending on the crystal orientation and distance of the metal ultrafine particles 11 to which the high energy beam 12 has not been irradiated and the intensity of the high energy beam 12, and lowers in accordance with, for example, an irradiation time of the high energy beam 12. In other words, the metal ultrafine particle bonded body having a small value Σ of the corresponding grain boundary (e.g., a metal ultrafine particle bonded body having Σ3 grain boundary) increases. Thus, when the plurality of metal ultrafine particle bonded bodies are considered as a whole, the metal ultrafine particle bonded body is further stabilized.

The stabilization of the plurality of metal ultrafine particle bonded bodies (the increase of bonded body having a small value Σ of the corresponding grain boundary) described above can be achieved in a shorter time as the intensity of the irradiating high energy beam 12 is higher. In other words, when the high energy beam 12 is irradiated for the same duration, the higher the intensity of the high energy beam 12, the more the number of the metal ultrafine particle bonded bodies having a small value Σ of the corresponding grain boundary. Specifically, the plurality of metal ultrafine particle bonded bodies become more stable, considered as a whole.

By additionally irradiating the high energy beam 12 to the stabilized plurality of metal ultrafine particle bonded bodies, the respective bonded particles are changed to a monocrystal grain, and the plurality of bonded particles are further bonded. And, a metal ultrathin film having monocrystal grains and polycrystal grains in a mixed state is obtained. As in the case of the previous embodiment, the lattice defects and subboundaries in the crystal particles are decreased or eliminated to provide a more stable state.

As described above, by irradiating the high energy beam 12 to the plurality of metal ultrafine particles 11 at the same time, the metal ultrafine particle bonded bodies can be stabilized, considered the plurality of metal ultrafine bonded bodies as a whole. Besides, the metal ultrathin film having monocrystal grains and polycrystal grains in a mixed state can be obtained.

Now, description will be made of an embodiment covering a fullerene-containing substance and a method for producing fullerenes of the invention. The fullerene of the invention utilizes the ultrafine particles, which are obtained by irradiating the slanting high energy beam to the target material having the pores described above, as a nucleation point.

Figure 4A:
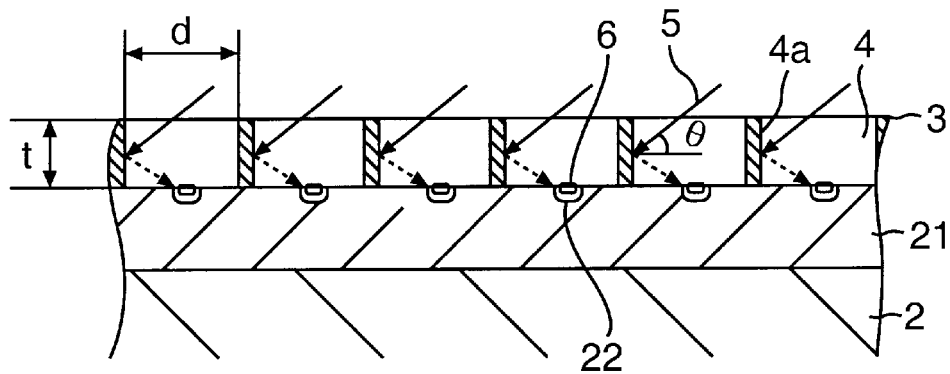
FIG. 4A and FIG. 4B are sectional views schematically showing one embodiment of a process for producing a fullerene-containing substance of the invention.
Figure 4B:
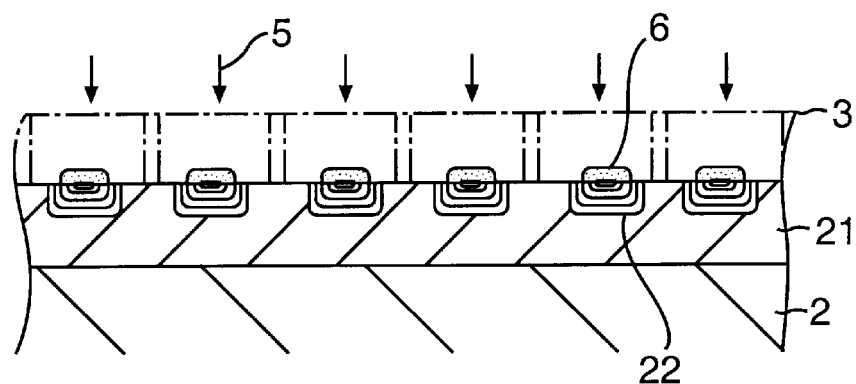

FIG. 4A to FIG. 4B are sectional views schematically showing one embodiment of a process for producing a giant fullerene (a fullerene-containing substance) of the invention. A process for producing the giant fullerene shown in FIG. 4 is the same as the process for producing ultrafine particles shown in FIG. 1 excepting that an amorphous carbon substrate is used as the substrate.

Specifically, an amorphous carbon film 21 is placed on a supporting member 2. As the amorphous carbon, i-carbon is used for example. As shown in FIG. 4A, a target material 3 having a plurality of pores 4 is placed on the amorphous carbon film 21, and a high energy beam 5 is irradiated to the pores' inner walls 4a in a slanting direction from above. The target material 3 may be various solid materials as described above. A specific form of the target material 3 is also the same as described above.

The pores 4 of the target material 3 provide positions where the fullerenes are formed. The inner walls 4a form surfaces of supplying a material for forming a nucleation substance, namely the constituent atoms or molecules of the target material 3. Therefore, the shape and arrangement of the pores 4 and the thickness of the target material 3 are determined taking into account the shape and arrangement of fullerenes to be obtained and an incidence angle θ of the high energy beam 5.

As described above, it is preferable that the pore 4 has a diameter of about 0.1 to 1×10³ μm, and the target material 3 has a thickness of about 0.2 to 1×10³ μm. The diameter d of the pore 4 and the thickness t of the target material 3 are preferably set so that $\tan^{-1}(t/d)$ is in a range of 20 to 45 degrees. Besides, they are more preferably set so that $\tan^{-1}(t/d)$ is in a range of 30 to 45 degrees.

FIG. 4A shows that the high energy beam 5 is irradiated to the inner walls 4a of the target material 3 in a slanting direction from above, the constituent atoms or molecules of the target material 3 are detached (indicated by the arrows with a dotted line), and these constituent atoms or molecules come into collision with and adsorb to the amorphous carbon film 21. Giant fullerenes 22 are grew with the collision points of the constituent atoms or molecules of the target material 3 as nucleation points. In other words, ultrafine particles 6 formed by the adhesion of the constituent atoms or molecules of the target material 3 serve as nucleation substances for the giant fullerenes 22.

The giant fullerenes 22 are grew because the collision points of the constituent atoms or molecules of the target material 3 serve effectively as the nucleation substances and the irradiated high energy beam 5 brings about an activating effect and a localized heating effect. As the giant fullerene thus grew, an onion-like graphite is cited as an example.

The high energy beam 5 irradiated is not particularly limited, and may be sufficient if it has energy sufficient to separate the constituent atoms or molecules from the target material 3. Its examples are as described above. An atmosphere in which the high energy beam 5 is irradiated is determined according to what beam is used. Examples include inert atmospheres such as a vacuum atmosphere and an argon atmosphere. And, an oxygen-containing atmosphere or a nitrogen atmosphere may be used as required.

As shown in FIG. 4B, the high energy beam 5 is irradiated for a predetermined time to form the target giant fullerenes 22 on or near the surface of the amorphous carbon film 21. Thus, a fullerene-containing substance is obtained by forming the giant fullerenes 22 on or near the surface of the amorphous carbon film 21. FIG. 4B shows that the giant fullerenes 22 are formed one each on the amorphous carbon film 21 at respective points corresponding to the pores 4 of the target material 3. The number of nucleation substances (ultrafine particles) 6 to be formed at the positions corresponding to the pores 4 can be controlled by the diameter of the pores 4 and the irradiation conditions of the high energy beam 5. A plurality of giant fullerenes 22 are formed at respective points corresponding to the pores 4.

The above process can be considered as growing process of the giant fullerenes 22 induced (formed) on or near the surface of the amorphous carbon film 21. The amorphous carbon film 21 around the giant fullerenes 22 is activated by the irradiated high energy beam 5 to grow the giant fullerenes 22. This process of growing (or a process of forming a target shape) the giant fullerenes 22 can be performed by continuously irradiating the high energy beam 5 to the inner walls 4a of the pores 4 in a slanting direction.

The giant fullerenes 22 can also be grown by irradiating the high energy beam 5 after removing the target material 3. At this time, the high energy beam 5 may be same as the one used for the slant irradiation or a different high energy beam. The irradiation time of the high energy beam 5 is determined as necessary according to the intensity of the high energy beam 5 and the size of the target giant fullerenes 22.

The amorphous carbon film 21 is held at room temperature when the high energy beam 5 is irradiated. Therefore, the giant fullerenes 22 are formed on a controllable room temperature stage. When the high energy beam 5 is irradiated, the amorphous carbon film 21 may be rotated. Thus, the nucleation substances (ultrafine particles 6) can be formed efficiently.

The giant fullerenes 22 are formed on or near the surface of the amorphous carbon film 21 at respective positions corresponding to the pores 4 of the target material 3. Therefore, the positions where the giant fullerenes 22 are formed can be controlled. Besides, the number and state of the giant fullerenes 22 to be obtained can be controlled by the intensity and irradiation time of the high energy beam 5, the rotation or not and the rotation speed of the amorphous carbon film 21, the impact resistance of the target material 3 against the high energy beam 5, the thickness of the target material 3, and the diameter of the pores 4.

By using the target material 3 having the plurality of pores 4, the plurality of giant fullerenes 22 with the forming positions controlled can be formed selectively in a mutually separated state on or near the surface of the amorphous carbon film 21. These giant fullerenes 22 are effective to grasp the physical properties of giant fullerenes, various operations and controls, and various applications and developments. The giant fullerenes 22 of the invention have possibilities of being applied to various materials such as semiconductor materials, superconductor materials, catalysts, lubricants, nonlinear optical materials, and biomedical materials.

In the above embodiment, the plurality of giant fullerenes 22 are formed in a separated state on or near the surface of the amorphous carbon film 21. In addition, the invention can mutually connect the plurality of giant fullerenes to form a film structure.

Figure 5:
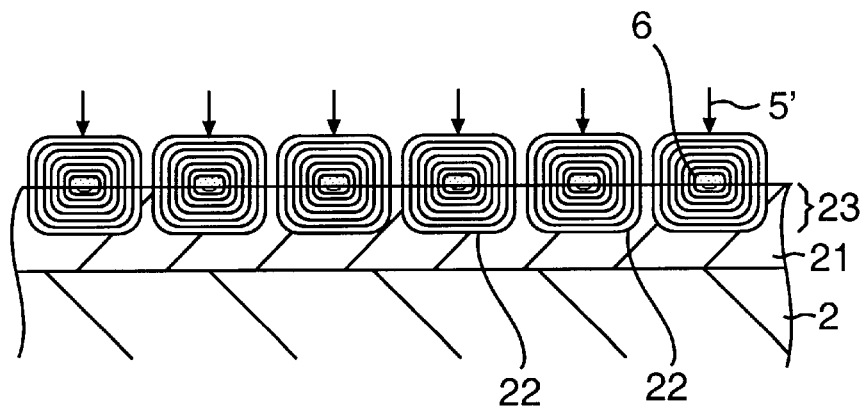
FIG. 5 is a sectional view schematically showing another embodiment of a fullerene-containing substance of the invention.

Specifically, FIG. 5 shows that a high energy beam 5' is irradiated to the plurality of giant fullerenes 22 which are formed in a separated state on or near the surface of the amorphous carbon film 21. The high energy beam 5' is preferably an electron beam having an intensity of, for example, $1 \times 10^{18}$ e/cm$^2$·sec or more. The beam is not limited to the electron beam but another high energy beam 5' may be irradiated.

By irradiating the high energy beam 5', the amorphous carbon film 21 around the giant fullerenes 22 is activated to further grow the giant fullerenes 22. With the growth of the giant fullerenes 22, the neighboring giant fullerenes 22 are bonded mutually. In other words, the giant fullerenes 22 are mutually bonded. Thus, there are obtained giant fullerene bonding which have carbon atoms in common on the outer shells of the neighboring plurality of giant fullerenes 22.

The irradiation of the high energy beam 5 for a given period leads to the production of a film structure (film-shaped giant fullerene) 23 which has the giant fullerenes connected mutually on the surface layer of the amorphous carbon film 21 as shown in FIG. 5. In FIG. 5, reference numeral 6 denotes adsorbents which were used as the nucleation point (nucleation substance) in forming the giant fullerenes 22. In other words, they are ultrafine particles formed of the constituent atoms or molecules of the target material 3. The irradiation time of the high energy beam 5' is determined as necessary according to the intensity of the high energy beam 5' or the size of the initial giant fullerenes.

The film-shaped giant fullerene 23 is effectively used for an application and a development utilizing the properties of the giant fullerenes. Besides, by controlling the irradiation conditions of the high energy beam 5', the giant fullerenes 22 can be grown to enclose the ultrafine particles 6 consisting of the constituent atoms or molecules of the target material 3. And, a film-shaped structure of an ultrafine particle-enclosing giant fullerene is obtained. The target material 3 for forming the initial nucleation points can be various solid materials as described above, so that there can be obtained a film-shaped giant fullerene enclosing the ultrafine particles 6 formed of various materials.

Now, description will be made of specific embodiments of the invention and the evaluated results.

EMBODIMENT 1

In the process of producing the ultrafine particles shown in FIG. 1A to FIG. 1C, a carbon film was used as the substrate 1, and a Pt mesh (a thickness of 200 $\mu$m) having a large number of pores 4 with a diameter of 100 $\mu$m was placed as the target material 3 on the carbon film. A Cu mesh as the supporting member 2 on which the above laminate was positioned was placed on a room temperature stage in a vacuum chamber.

An Ar ion beam was irradiated in a slanting direction to pore inner walls of the Pt mesh for 180 seconds while the carbon film and the Pt mesh were being rotated at 2 rpm. The Ar ion beam had an acceleration voltage of 3.0 kV and a beam current of 0.25 mA. The Ar ion beam was irradiated at an incident angle θ of 40 degrees. And, the Ar ion beam was irradiated in a vacuum atmosphere (containing Ar) of about $1 \times 10^{-1}$ Pa.

Figure 6:
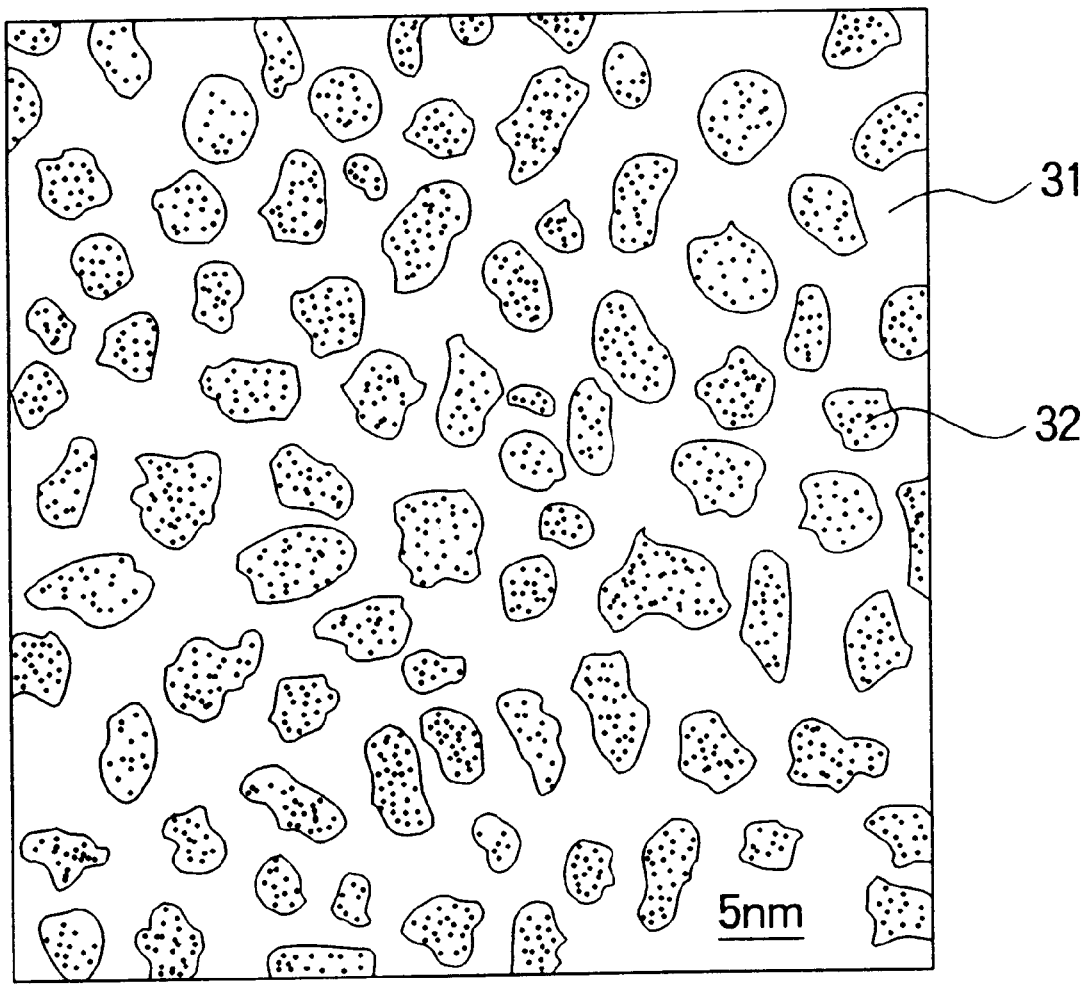
FIG. 6 is a schematic view showing a result of observing by TEM Pt ultrafine particles produced in the embodiment 1.

After irradiating the Ar ion beam, the surface of the carbon film was subjected to TEM observation. It was found that a plurality of Pt ultrafine particles were formed on the carbon film at respective positions corresponding to the pores of the Pt mesh. FIG. 6 shows schematically the results of the TEM observation. As shown in FIG. 6, a large number of Pt ultrafine particles 32 were on the carbon film 31 in a dispersed state.

Figure 7:
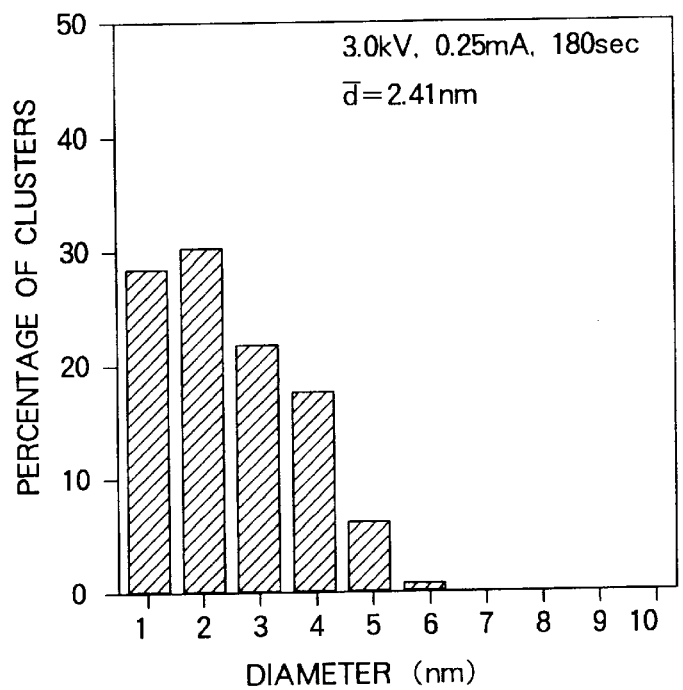
FIG. 7 is a graph showing results of measuring the diameters of Pt ultrafine particles produced in the embodiment 1.
Figure 8:
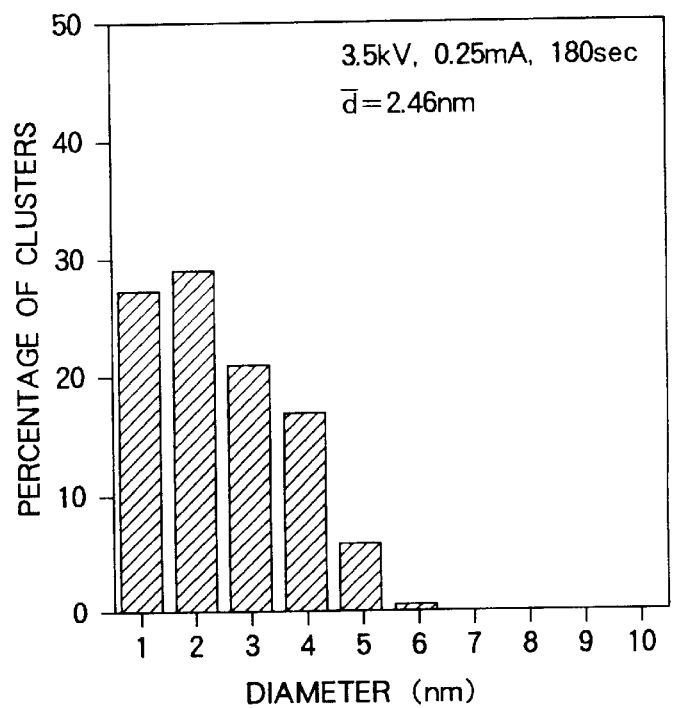
FIG. 8 is a graph showing results of measuring the diameters of Pt ultrafine particles produced with the conditions changed.

FIG. 7 shows the diameters of the Pt ultrafine particles 32 examined. As shown in FIG. 6 and FIG. 7, a large number of Pt ultrafine particles 32 having an average diameter of 2.41 nm could be obtained in a dispersed state in this embodiment. FIG. 8 shows the results obtained by examining the diameters of Pt ultrafine particles produced under the same conditions excepting that the acceleration voltage of the Ar ion beam was changed to 3.5 kV. Thus, the diameters of the Pt ultrafine particles can be controlled by changing the irradiation conditions of the Ar ion beam.

Figure 9:
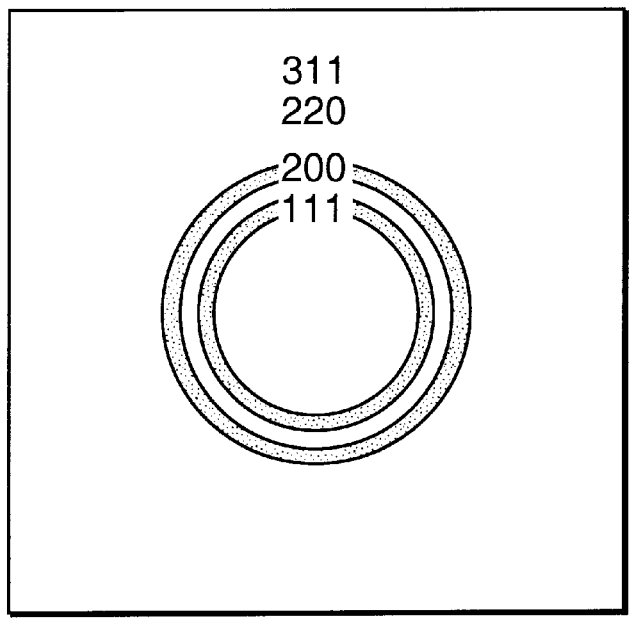
FIG. 9 is a schematic view showing an electron diffraction pattern of Pt ultrafine particles immediately after the production in the embodiment 1.
Figure 10:
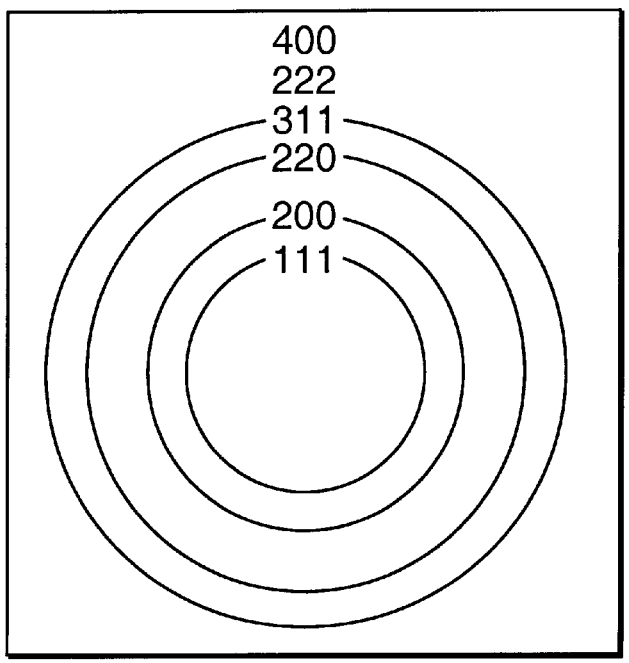
FIG. 10 is a schematic view showing an electron diffraction pattern immediately after irradiating an electron beam of $1.0 \times 10^{20}$ e/cm$^2$·sec to Pt ultrafine particles produced in the embodiment 1 for 240 seconds.

And, FIG. 9 shows schematically an electron diffraction pattern of the Pt ultrafine particles 32 immediately after the production. It is apparent from the drawing that the Pt ultrafine particles 32 immediately after the production are low in crystallizability. Then, an electron beam of $1 \times 10^{20}$ e/cm$^2$·sec was irradiated to the Pt ultrafine particles 32 for 240 seconds. FIG. 10 shows schematically an electron diffraction pattern after the irradiation of the electron beam. It is seen from FIG. 10 that the crystallizability of the Pt ultrafine particles was improved. Thus, the crystallizability can be improved by irradiating an electron beam to the Pt ultrafine particles.

Since the Pt atoms are separated from the Pt mesh by irradiating the Ar ion beam to the Pt mesh in a slanting direction, a large number of Pt ultrafine particles can be formed on the carbon film at the positions corresponding to the pores of the Pt mesh. Therefore, a large number of Pt ultrafine particles present in a separated form can be obtained easily. And, their sizes can also be controlled. Besides, by changing the positions where the pores of the Pt mesh are formed and the regions on the Pt mesh to which the Ar ion beam is irradiated, the positions where the Pt ultrafine particles are formed can be controlled.

EMBODIMENT 2

A carbon film was used as the substrate, and an Au mesh (a thickness of 200 μm) having a large number of pores with a diameter of 100 μm was placed as the target material on the carbon film. A Cu mesh as the supporting member on which the above laminate was positioned was placed on a room temperature stage in a vacuum chamber.

An Ar ion beam was irradiated in a slanting direction to the pores' inner walls of the Au mesh for 200 seconds while the carbon film and the Au mesh were being rotated at 2 rpm. The Ar ion beam had an acceleration voltage of 3.0 kV and a beam current of 0.5 mA. The Ar ion beam was irradiated at an incident angle θ of 35 degrees. And, the Ar ion beam was irradiated in a vacuum atmosphere (containing Ar) of about $1\times10^{-3}$ Pa.

After irradiating the Ar ion beam, the surface of the carbon film was subjected to TEM observation. It was found that a plurality of Au ultrafine particles were formed on the carbon film at respective positions corresponding to the pores of the Au mesh. The obtained Au ultrafine particles had an average diameter of 2.4 nm.

EMBODIMENT 3

A carbon film was used as the substrate, and an Si mesh (a thickness of 300 μm) having a large number of pores with a diameter of 150 μm was placed as the target material on the carbon film. This Si mesh had the pores formed by etching with hydrofluoric acid. A Cu mesh as the supporting member on which the above laminate was positioned was placed on a room temperature stage in a vacuum chamber.

An Ar ion beam was irradiated in a slanting direction to the pores' inner walls of the Si mesh for 300 seconds while the carbon film and the Si mesh were being rotated at 2 rpm. The Ar ion beam had an acceleration voltage of 3.5 kV and a beam current of 0.5 mA. The Ar ion beam was irradiated at an incidence angle θ of 40 degrees. And, the Ar ion beam was irradiated in a vacuum atmosphere (containing Ar) of about $1\times10^{-3}$ Pa.

After irradiating the Ar ion beam, the surface of the carbon film was subjected to TEM observation. It was found that a plurality of Si ultrafine particles were formed on the carbon film at respective positions corresponding to the pores of the Si mesh. The obtained Si ultrafine particles had an average diameter of 3 nm.

EMBODIMENT 4

The Pt ultrafine particles (a large number of Pt ultrafine particles 32 shown in FIG. 6) produced in Embodiment 1 were used to prepare ultrafine particle bonded bodies. First, an electron beam of $1.0\times10^{20}$ e/cm$^2$·sec was irradiated to the great number of Pt ultrafine particles for 240 seconds. FIG. 10 shows the electron diffraction pattern at the time.

Figure 11:
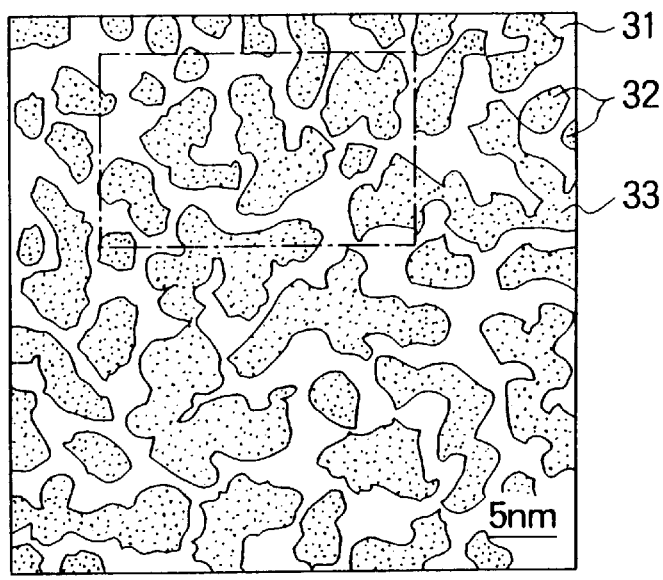
FIG. 11 is a schematic view showing a result of observing by TEM after irradiating an electron beam of $1.0 \times 10^{20}$ e/cm$^2$·sec to the plurality of Pt ultrafine particles shown in FIG. 6 for 700 seconds.
Figure 12:
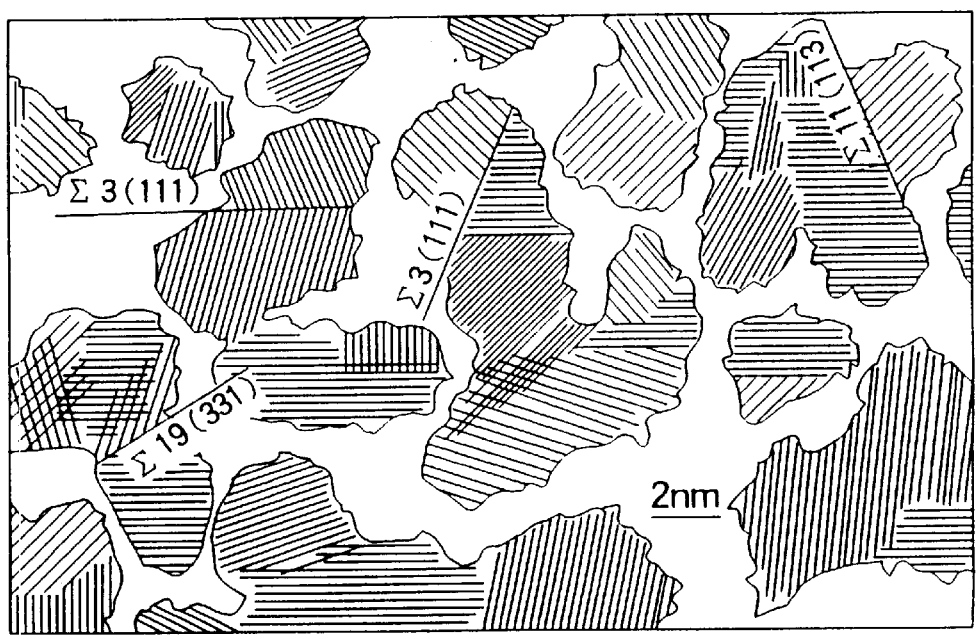
FIG. 12 is a schematic view showing portion of the plurality of Pt ultrafine particles shown in FIG. 11 in an HETRM image.

FIG. 11 shows schematically a result of TEM observation after irradiating the electron beam for 700 seconds. It is seen from FIG. 11 that the Pt ultrafine particles 32 were mutually bonded by the irradiation of the electron beam to produce Pt ultrafine particle bonded bodies 33. FIG. 12 shows schematically an HETRM image of the area enclosed by a dash and dotted line in FIG. 11. It is seen from FIG. 12 that by irradiating an electron beam of $1.0\times10^{20}$ e/cm$^2$·sec to the plurality of Pt ultrafine particles disposed to adjoin mutually for 700 seconds, there were obtained respective Pt ultrafine particle bonded bodies having a corresponding grain boundary Σ3(111), a corresponding grain boundary Σ11(113), and a corresponding grain boundary Σ19(331).

In this step, there is a large ratio of the Pt superfine particle bonded bodies having a high corresponding grain boundary value Σ19. Stabilization is insufficient when the Pt ultrafine particle bonded bodies are considered as a whole.

The electron beam under the same condition was irradiated to the Pt ultrafine particle bonded bodies shown in FIG. 11 and FIG. 12 for 300 seconds. As a result, the Pt ultrafine particle bonded bodies having a low value Σ of the corresponding grain boundary, for example, the Pt ultrafine particle bonded bodies having a corresponding grain boundary Σ3, were increased. Thus, by irradiating the electron beam to the Pt ultrafine particle bonded bodies, the Pt ultrafine particle bonded bodies can be stabilized.

Figure 13:
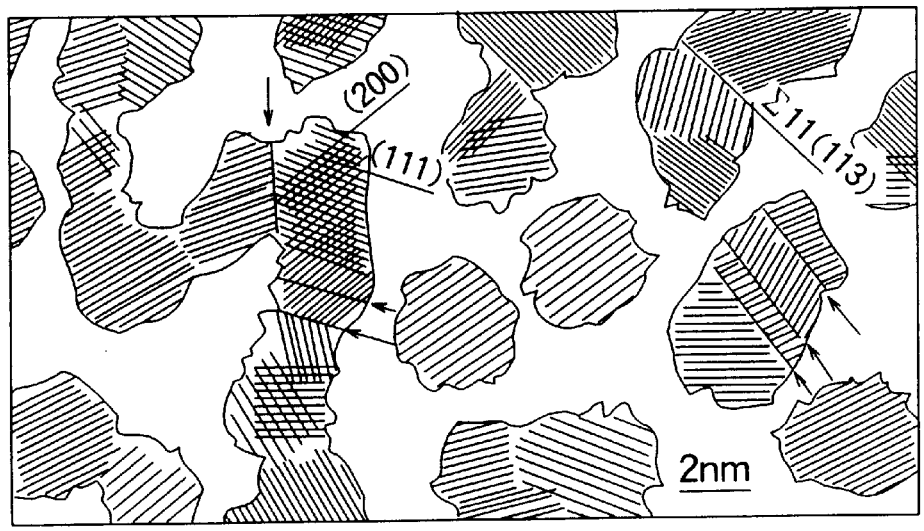
FIG. 13 is a schematic view showing a result of observing by TEM after irradiating an electron beam of $2.1 \times 10^{20}$ e/cm$^2$·sec to a plurality of Pt ultrafine particles for 700 seconds.

Meanwhile, an electron beam of $2.1\times10^{20}$ e/cm$^2$·sec was irradiated to a large number of Pt ultrafine particles obtained in the same way as the above embodiment for 700 seconds. FIG. 13 shows schematically the results of TEM observation after the irradiation of the electron beam. It is seen from FIG. 13 that compared with the irradiation of the electron beam of $1.0\times10^{20}$ e/cm$^2$·sec, there were obtained the Pt ultrafine particle bonded bodies having much more grain boundaries Σ3. Thus, by enhancing the intensity of the electron beam to be irradiated to the Pt ultrafine particles, the Pt ultrafine particle bonded bodies can be stabilized in a short period.

EMBODIMENT 5

Figure 14:
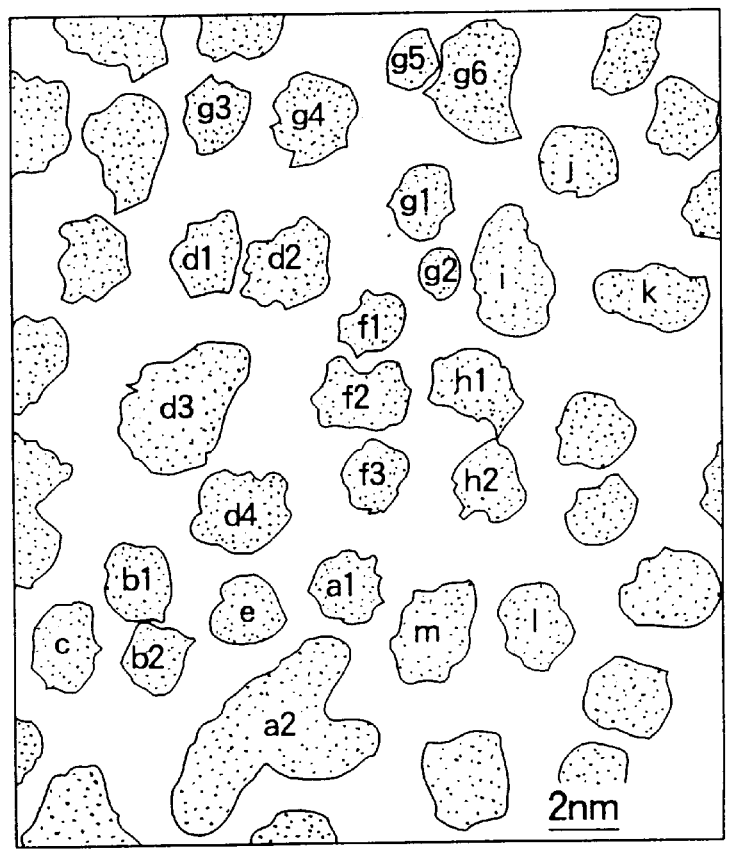
FIG. 14 is a schematic view showing a result of observing by TEM other Pt ultrafine particles used as starting substance for a bonded body of ultrafine particles.
Figure 15:
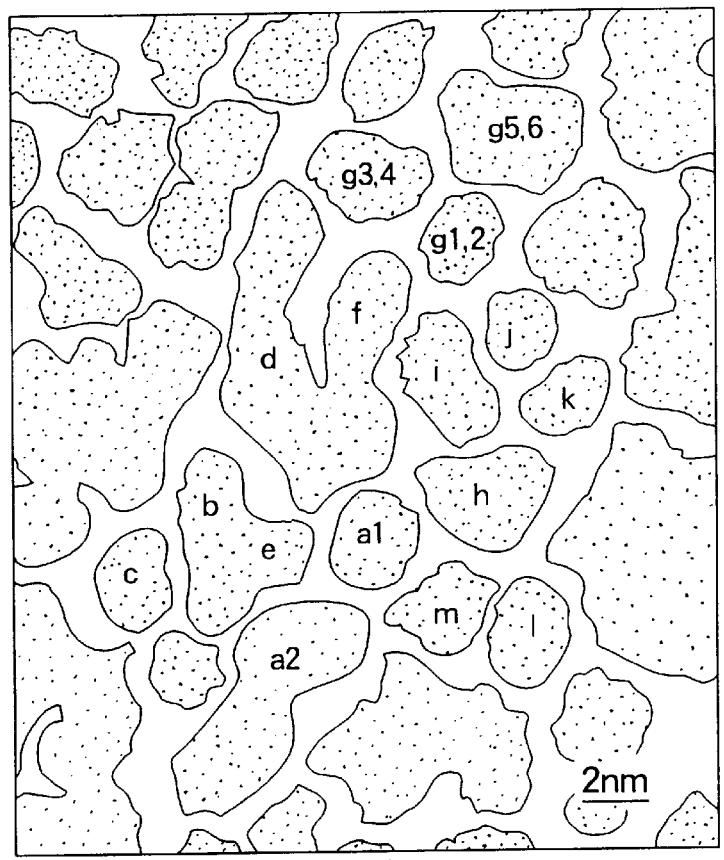
FIG. 15 is a schematic view showing a result of observing by TEM after irradiating an electron beam of $3.3 \times 10^{20}$ e/cm$^2$·sec to the plurality of Pt ultrafine particles shown in FIG. 14 for 300 seconds.

An electron beam of $3.3\times10^{20}$ e/cm$^2$·sec was irradiated to a large number of Pt ultrafine particles produced in the same way as in Embodiment 4 in a vacuum atmosphere of about $1\times10^{-5}$ Pa. FIG. 14 shows schematically a result of TEM observation of the Pt ultrafine particles before the irradiation of the electron beam. FIG. 15 shows schematically a result of TEM observation at a stage completing the irradiation of the electron beam for 300 seconds. And, FIG. 16 shows schematically a result of TEM observation after the irradiation of the electron beam for 1000 seconds.

Figure 17:
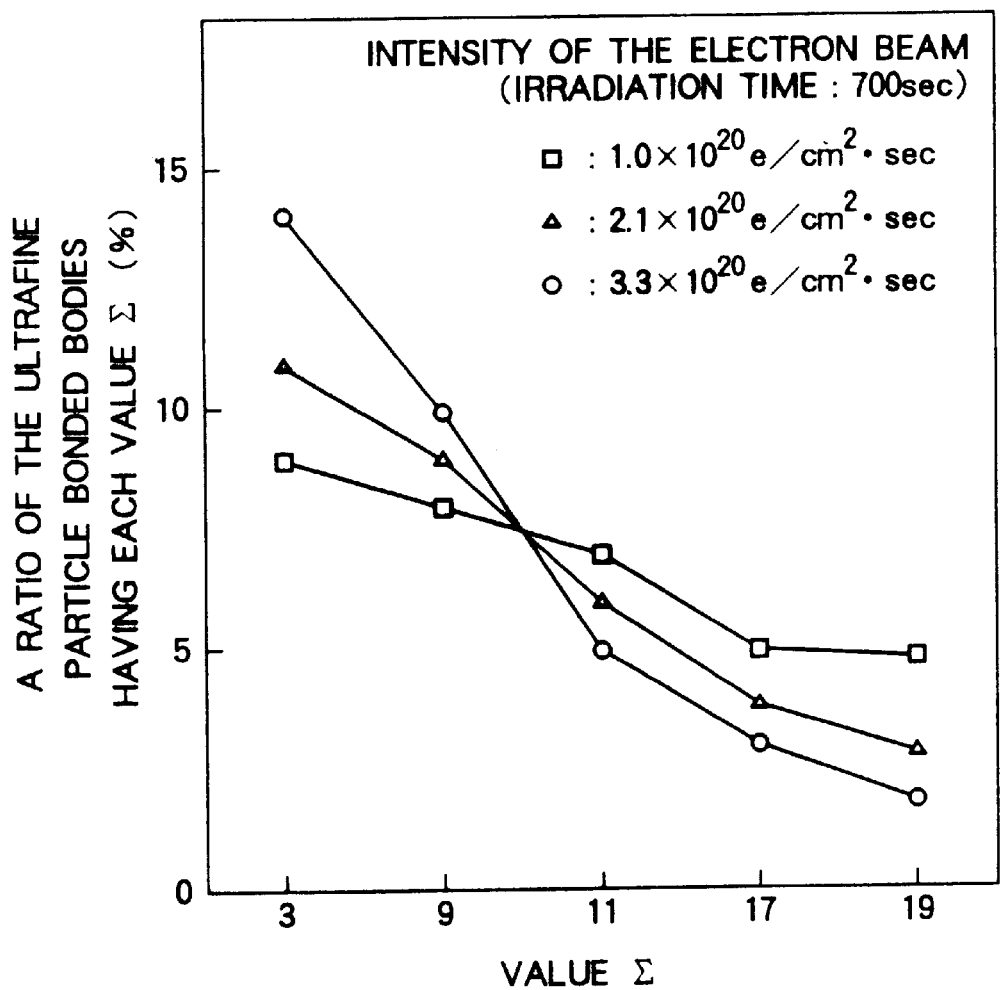
FIG. 17 is a graph showing the relation between value $\Sigma$ of a bonded body of ultrafine particles and its ratio when an intensity of irradiating electron beams was varied.

It is seen from FIG. 14 and FIG. 15 that the Pt ultrafine particles were mutually fused by the irradiation of the electron beam. And, it was also found that by additional irradiation of the electron beam, the Pt ultrafine particle bonded body having a small value Σ of corresponding grain boundary, for example, grain boundary Σ3, are increased. FIG. 17 shows a ratio of the ultrafine particle bonded bodies having each value Σ after irradiating the electron beam for 700 seconds with the intensity of the electron beam as shown in Embodiments 4 and 5. It is apparent from FIG. 17 that by enhancing the intensity of the electron beam to be irradiated to the Pt ultrafine particles, there are obtained more Pt ultrafine particle bonded body having a small value Σ of corresponding grain boundary. In other words, the Pt ultrafine particle bonded bodies can be stabilized in a short period.

Figure 16:
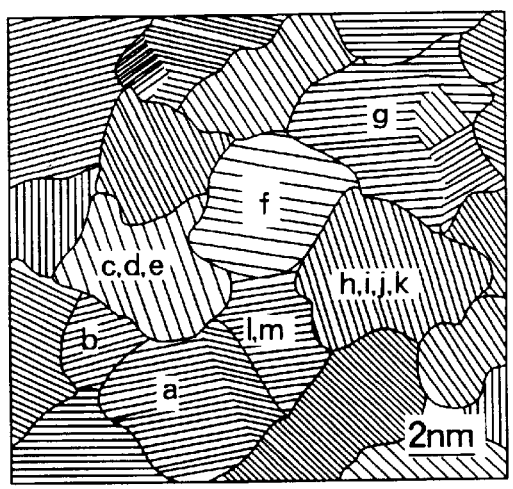
FIG. 16 is a schematic view showing a result of observing by TEM after irradiating an electron beam of $3.3 \times 10^{20}$ e/cm$^2$·sec to the plurality of Pt ultrafine particles shown in FIG. 14 for 1000 seconds.

It is seen from FIG. 16 that by continuing the electron beam irradiation after producing the bonded bodies and lowering the value Σ, the Pt ultrathin film having monocrystal grains and polycrystal grains in a mixed state is obtained. And, it was found from the result of TEM observation at the stage after irradiating the electron beam for 700 seconds that dislocations within the crystal grains were not many. And, it was also found that most Burgers vectors were 3/a<111> and dislocations were caused by the irradiation of the electron beam to decrease defects.

EMBODIMENT 6

In the process of producing the giant fullerenes shown in FIG. 4A and FIG. 4B, an i-carbon film was used as the amorphous carbon film 21. A Cu mesh (a thickness of 400 µm) having a plurality of pores 4 with a diameter of 200 µm was disposed on the i-carbon film. And, they were placed on a room temperature stage in a vacuum chamber.

An Ar ion beam was irradiated in a slanting direction to the pore inner walls of the Cu mesh for 300 seconds while the i-carbon film and the Cu mesh were being rotated at 2 rpm. The Ar ion beam had an acceleration voltage of 3.0 kV and a beam current of 0.25 mA. The Ar ion beam was irradiated at an incident angle θ of 40 degrees. And, the Ar ion beam was irradiated in a vacuum atmosphere (containing Ar) of about $1 \times 10^{-3}$ Pa.

By irradiating the Ar ion beam in a slanting direction, Cu atoms were detached from the pore inner walls of the Cu mesh to come into collision with the i-carbon film. It was confirmed from the fact that Cu ultrafine particles having an average diameter of 3 nm were formed on the i-carbon film at respective positions corresponding to the pores of the Si mesh after the irradiation of the Ar ion beam.

After irradiating the Ar ion beam, the surface of the i-carbon film was subjected to TEM observation. It was found that carbon textures were grew in a form of concentric circles at the positions below the Cu ultrafine particles on the surface layer of the i-carbon film. Since these carbon textures in the form of concentric circles had layer intervals of about 0.35 nm, they were identified to be onion-like graphites, one type of giant fullerenes. In other words, it was confirmed that the onion-like graphites were formed in more than one on or near the surface of the i-carbon film. At this time, the onion-like graphites had an average diameter of about 20 nm. Around the onion-like graphites, the amorphous carbon was maintained.

Thus, by irradiating the Ar ion beam to the Cu mesh in a slanting direction, the Cu atoms were detached from the Cu mesh to collide with the amorphous carbon film. With these collision points as the nucleation points, the giant fullerenes like the onion-like graphites can be formed on or near the surface of the amorphous carbon film. Thus, a large number of onion-like graphites present in a separate state can be obtained easily with their formed positions controlled.

Then, an electron beam of $1.0 \times 10^{20}$ e/cm$^2$·sec was irradiated to the large number of onion-like graphites existing in the separate state on or near the surface of the i-carbon film in a vacuum atmosphere of $1 \times 10^{-5}$ Pa for 100 seconds. After irradiating the electron beam, the i-carbon film was subjected to TEM observation. As a result, it was confirmed that the neighboring onion-like graphites were bonded to form the film-like giant fullerene shown in FIG. 5. Thus, the film-like giant fullerene can be obtained by further irradiating the electron beam to the giant fullerenes in a large number in the separate state.

To compare with the present invention, an electron beam was irradiated to an amorphous carbon film formed of an i-carbon under the same conditions as in the above embodiment without arranging metal superfine particles such as Cu. But, giant fullerenes were not produced.

As apparent from the above embodiments, the present invention can provide an ultrafine particle which can be controlled and operated as a unit substance in various ways, and particularly excel in controllability of a position where it is formed. Therefore, the ultrafine particle is contributed greatly to a study on physical properties or applications of the ultrafine particle. And, an ultrafine particle bonded body excelling in stability of bonded interfaces can be obtained under the controlled conditions with good reproducibility. Thus, since the stability of the bonded interfaces can be controlled by the present invention, the ultrafine particles are greatly contributed to applications and developments from the metal ultrafine particles as a unit substance. Besides, a fullerene that the forming conditions such as shape and forming position are controlled can be obtained under controlled conditions with good reproducibility. The fullerene of the invention are contributed greatly to applications and developments.

What is claimed is:

1. Ultrafine particles formed on a substrate by directing a slanting high energy irradiating beam against side walls of a plurality of pores in a target material disposed on the substrate, the ultrafine particles consisting of constituent atoms or molecules detached from the target material by the slanting high energy beam and existing at positions corresponding to the positions of the pores of the target material on the substrate as discrete, separate particles, said particles having a controllable size, number, and state.

2. The ultrafine particles of claim 1, wherein the ultrafine particles are selected from the group consisting of metal ultrafine particles, semiconductor ultrafine particles, and metal compound ultrafine particles.

3. The ultrafine particles of claim 1, wherein the ultrafine particles have a diameter in the range of 1 to 10 nm.

4. The ultrafine particles of claim 1, wherein the substrate is selected from the group consisting of a metal substrate, a non-metal substrate, a semiconductor substrate, and a metal compound substrate.

* * * * *

UNITED STATES PATENT AND TRADEMARK OFFICE
CERTIFICATE OF CORRECTION

PATENT NO.: 6,017,630

DATED: January 25, 2000

INVENTOR(S): Tanaka et al.

It is certified that an error appears in the above-identified patent and that said Letters Patent is hereby corrected as shown below:

Title page, item [73] (Assignees), line 1, change "Research Development Corporation;" to --Research Development Corporation of Japan--.

Signed and Sealed this

Twentieth Day of March, 2001

Attest:

NICHOLAS P. GODICI

*Attesting Officer*    *Acting Director of the United States Patent and Trademark Office*